N. A. COBB.
MICROSCOPE FINDER SLIDE.
APPLICATION FILED DEC. 10, 1915.
1,264,489.
Patented Apr. 30, 1918.
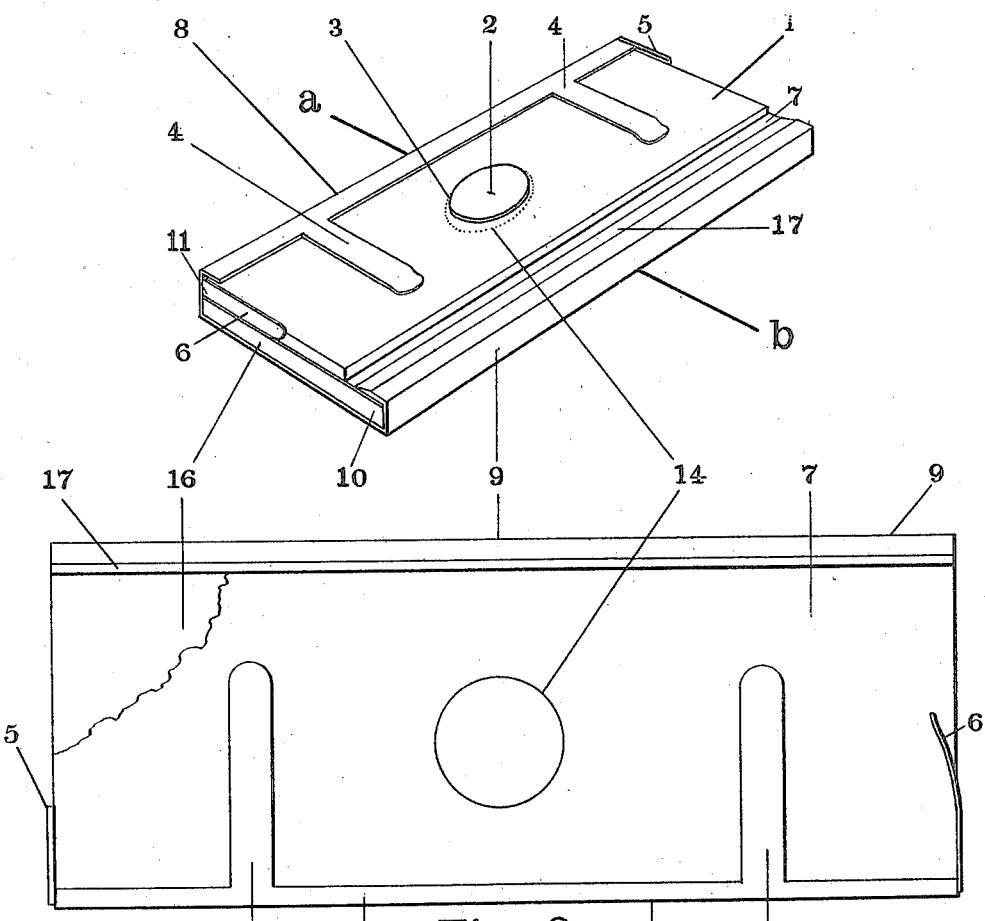

UNITED STATES PATENT OFFICE.

NATHAN AUGUSTUS COBB, OF FALLS CHURCH, VIRGINIA.

MICROSCOPE FINDER-SLIDE.

1,264,489. Specification of Letters Patent. Patented Apr. 30, 1918.

Application filed December 10, 1915. Serial No. 66,211.

*To all whom it may concern:*

Be it known that I, NATHAN AUGUSTUS COBB, citizen of the United States, residing at Falls Church, in the county of Fairfax and State of Virginia, have invented certain new and useful Improvements in Microscope Finder-Slides, of which the following is a specification.

My invention relates to that form of microscope finder-slide in which the position of the microscopic object is recorded by means of numbers placed on the finder-slide, and differs from other finder-slides in that it is adapted so to receive and hold in a definite position the microscope slide carrying the object, that in order to read the finder-slide numbers recording the position of the object it is only necessary to rack the microscope barrel down a little farther, an operation which brings the desired numbers into the field of view. My finder-slide, therefore, has this advantage among others, that it does not have to be brought on to the microscope stage and fixed in position anew each time the position of a new object is to be recorded, a decided advantage when a number of objects on the same slide are to be located in succession. This is because in practice the microscope slide is clamped to my finder-slide so that both move together on the stage of the microscope during the examination. My finder-slide is only slightly larger than an ordinary microscope slide, and lies on the stage of the microscope, and can be clamped by the mechanical stage of the microscope in substantially the same way as a microscope slide.

Figure 1 is an enlarged perspective view of my finder-slide, carrying an ordinary microscope slide clamped so that the position of the objects on it may be recorded.

Fig. 2 shows an enlarged plan view of my finder-slide.

Fig. 3 shows an enlarged cross section of my finder-slide on the line $a, b$, Fig. 1.

Similar numbers refer to similar parts throughout the several views.

In Fig. 1, the microscope slide 1 has mounted upon it a microscopic object 2 covered by the round cover-glass 3. The microscope slide is held against the upper face of the finder-slide by the springs 4, and is held in register with the finder-slide by means of the stop 5, and the spring 6 which forces the slide 1 against the stop 5. The finder-slide consists of two main parts viz: a transparent rectangular piece 16, carrying the recording numbers, and a framework, 8, 9, holding this transparent piece in a fixed position and carrying springs for holding the microscope slide against the transparent piece and in register with it. The transparent piece is shown at 16 and is only very slightly, if any, shorter and narrower than the framework into which it is fitted. The framework for holding the transparent recording piece is conveniently made of thin metal bent or folded at the sides as shown in the figures. The fold 9, and its groove 10, are adapted to receive the transparent piece and hold it in position against the other side of the framework, which is bent so as to form a groove 11, which receives the other edge of the transparent piece as well as the edge of the microscope slide.

In Fig. 3 the end of the microscope objective 18 is shown focused on the object 2, located on the slide 1. The recording figures are located on or near one of the surfaces of the transparent piece 16, so that in order to read the figures recording the position of the object 2, it is only necessary to rack the objective 18 down a distance very slightly greater than the thickness of the microscope slide 1. The arrow 13 shows the direction of the light coming from the microscope mirror. This light passes through the apertures 15 and 14 existing for the purpose in the framework and safety piece respectively, the safety piece 7 being placed on the upper surface of the transparent piece 16, in order to prevent scratching and abrasion of the transparent piece 16, just as the metal of the framework prevents the lower surface of this transparent piece from being scratched and abraded. This safety piece is not necessary for the efficient use of my finder-slide, and may be omitted in its construction. The safety piece is mainly a device for making the finder-slide more durable. The constant insertion and removal of microscope slides tends to wear the upper surface of the transparent piece carrying the recording numbers. This wear on the transparent piece is reduced by the safety piece.

In Fig. 2 the finder-slide is shown without the microscope slide. In this case the spring 6, in its unstrained position stands somewhat within the contour of the finder-slide. Fig. 3 shows more clearly than the other figures the apertures 15 and 14 in the framework and safety piece respectively. These apertures are necessary for the passage of light from the mirror of the microscope. The recording numbers on the finder-slide are microscopically small and on that account do not show in any of the figures. They need not present any unusual feature, though they are dark figures on a transparent background. They take up so little space that they do not materially interfere with the passage of light or prevent the use of the microscope in the ordinary way.

The upper surface of the framework 8, 9, near the outer edge of the finder-slide at 17 is beveled so the microscope slide may be more easily inserted and removed.

The stop 5, and the spring 6 may be the two extremities of a single piece situated in the groove 11, and held in position by friction or by rivets or by cement. In the form shown 5 and 6 are represented as the extremities of such a piece whose cross section is seen at 12, Fig. 3, and is held in position in this case by friction. In Fig. 2 the upper left-hand corner portion of the safety piece 7 is removed disclosing the transparent piece 16.

I am aware that the ends accomplished by my invention can be accomplished in a considerable number of other forms embodying the same principles, and that the different parts may be made of different substances and be of different dimensions; that, for instance, the transparent piece may be made of glass, celluloid, collodion, gelatin, etc., and I have used all these substances in numerous experiments made in developing my finder-slide; also that the stop and the various springs can be placed in various positions so as to clamp the microscope slide against the piece carrying the recording numbers; thus the framework may be made with springs of the general form shown in Fig. 1, but placed at the ends of the framework instead of at one side, or springs having oblique surfaces and pressing against the edge of the microscope slide, instead of against one of its faces, and so be made to hold the microscope slide in a definite position on the finder-slide, and I have, in fact, constructed apparatus of this character for this purpose during many years of use of microscope finder-slides. I am also aware that other forces than the elasticity of springs can be used to accomplish the same end, such as capillarity, etc. In connection with the form shown in the accompanying figures, I desire to present only the following claims.

I claim:

1. A microscope finder-slide consisting of a framework perforated for the passage of light and carrying a transparent piece marked with recording numbers, and means for clamping a microscope slide in a definite position on the framework and opposite the recording numbers.

2. A microscope finder-slide consisting of an element on which recording marks are located, this finder-slide being capable of carrying a microscope slide and having a stop at one end determining the register of the microscope slide, and a spring at the other end to hold the microscope slide against the stop.

3. A microscope finder-slide capable of carrying a microscope slide, and carrying a transparent piece on which recording numbers are located, and having a stop at one end determining the register of the microscope slide and a spring at the other end to hold the microscope slide against the stop.

4. A microscope finder-slide capable of carrying a microscope slide and consisting of a framework perforated for the passage of light, into which is fitted a transparent piece on which recording numbers are located, and means for clamping a microscope slide in a definite position on the framework, and having a stop at one end determining the register of the microscope slide and a spring at the other to hold the microscope slide against the stop.

5. A microscope finder-slide capable of carrying a microscope slide, having a surface upon which recording numbers are placed, and springs for holding a microscope slide against the surface in a definite position.

6. A microscope finder-slide capable of carrying a microscope slide, having a surface upon which recording numbers are placed, and means for holding a microscope slide in a definite position against the surface.

7. A microscope finder-slide having a framework perforated for the passage of light and carrying a surface upon which recording numbers are placed, a stop at one end determining the register of the microscope slide, a spring at the other to hold the microscope slide against the stop, and means for holding a microscope slide against the surface.

8. A microscope finder-slide capable of carrying a microscope slide and consisting of a framework perforated for the passage of light, holding a transparent piece marked with recording numbers, and above the transparent piece a safety piece also perforated for the passage of light, and in practice lying between the transparent piece and the microscope slide.

9. In a microscope finder-slide capable of carrying a microscope slide in a definite position, a transparent piece marked with recording numbers, a stop at one end determining the register of the microscope slide and a spring at the other end to hold the microscope slide against the stop, the spring and the stop being opposite ends of one and the same piece, which is held in position by friction or otherwise and bears against the transparent piece below, and the framework above.

10. A microscope finder-slide capable of carrying a microscope slide in a definite position, consisting of a framework carrying a piece on which recording numbers are placed, and carrying springs to hold the microscope slide against the piece bearing the recording numbers and having the outer or farther upper edge of the framework folded over the piece bearing the recording numbers and beveled so as to facilitate the removal of the microscope slide.

In testimony whereof I affix my signature in presence of two witnesses.

NATHAN AUGUSTUS COBB.

Witnesses:
ALICE V. COBB,
RUTH COBB.